Aug. 21, 1934. F. E. WHITE ET AL Re. 19,285

TANK AND LIQUID LEVEL INDICATOR THEREFOR

Original Filed July 25, 1931 3 Sheets-Sheet 1

Inventors
Fred E. White
Alfred Ruttiman
By Spear, Donaldson & Hall
Attorneys

TANK AND LIQUID LEVEL INDICATOR THEREFOR

Original Filed July 25, 1931 3 Sheets-Sheet 2

Inventors
Fred E. White
Alfred Ruttiman
By Spear Dawidson & Hall
Attorneys

TANK AND LIQUID LEVEL INDICATOR THEREFOR

Original Filed July 25, 1931 3 Sheets-Sheet 3

Inventors
Fred E. White
Alfred Ruttiman
By Spear, Donaldson & Hull
Attorneys

Reissued Aug. 21, 1934

Re. 19,285

UNITED STATES PATENT OFFICE 19,285

TANK AND LIQUID LEVEL INDICATOR THEREFOR

Fred E. White and Alfred Ruttiman, Gardner, Mass, assignors to Florence Stove Company, Gardner, Mass., a corporation of Massachusetts Original No. 1,911,099, dated May 23, 1933, Serial No. 553,160, July 25, 1931. Application for reissue February 12, 1934, Serial No. 710,954

21 Claims. (Cl. 73—82)

One object of the present invention is to provide a tank for oil stoves and the like adapted to be set either in upright position for feeding or in reversed position for filling and having means to indicate the level of the oil in either position of said tank, said indicating means being common to both positions of the tank in the sense that the same mechanism will serve equally as an indicator for both the upright and reversed positions of said tank.

Another object is to provide a gauge which is particularly simple in construction and highly efficacious in operation for association with a liquid tank or reservoir occupying one position during feeding and another during filling, which gauge will readily indicate the approximate liquid condition in the tank, or liquid level during both of the positions of the tank.

A further object is to provide oil level indicating means having graduations that can be readily read whether the tank be in working position on the lower reservoir or in an upside down position for filling with oil or other liquid.

A further object is to provide such an indicating mechanism as may be located in substantially the plane of one wall of the tank so that the float carrying arm may be of the maximum length in respect to the cross sectional dimension of the tank. In other words, we aim to provide such an arrangement that the float may be located closely adjacent one wall of the tank whereas the indicating mechanism may be located closely adjacent or substantially in the same vertical plane of the other wall of the tank, thus enabling a long float arm to be employed, extending substantially from one wall entirely across the tank to the other wall.

In the drawings

Figure 12:
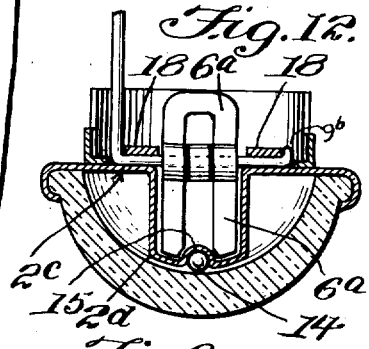
Figure 6:
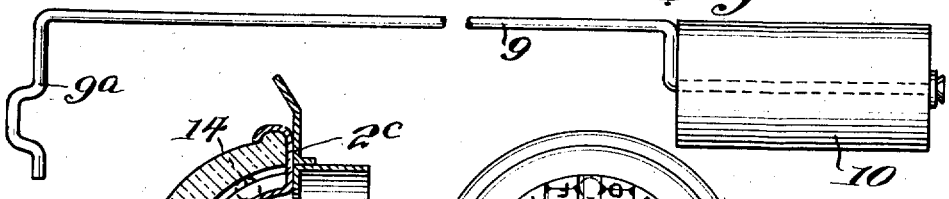
Figure 6 shows the float, and the arm and crank therefor.
Figure 10:
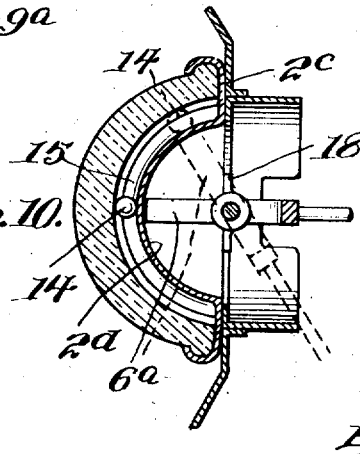
Figure 11:
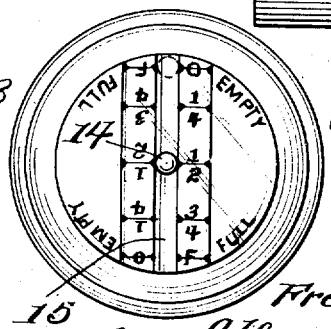

Figures 10, 11, and 12 are views of a modification.

Figure 13:
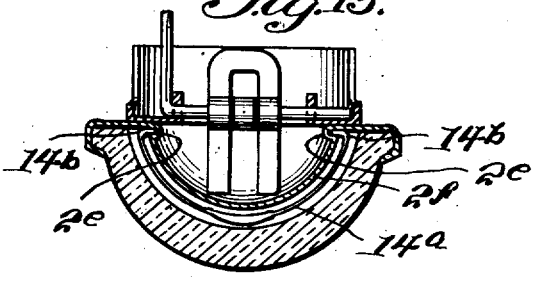
Figure 14:
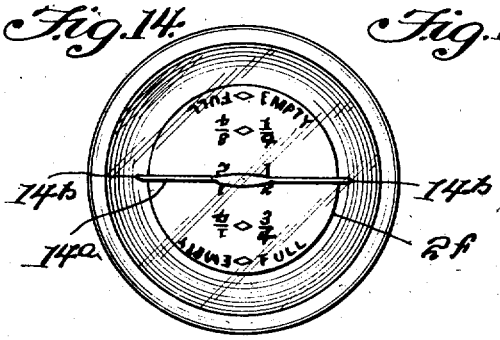

Figures 13 and 14 are views of another modification.

Figure 15:
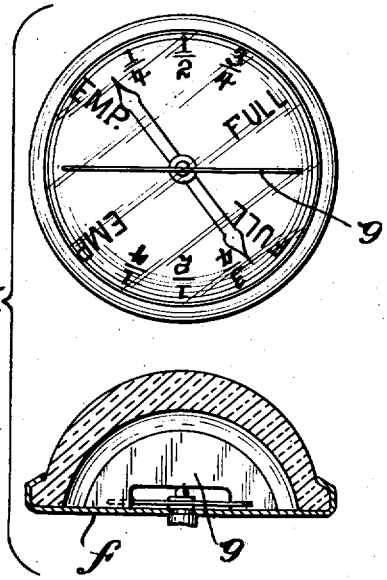
Figure 16:
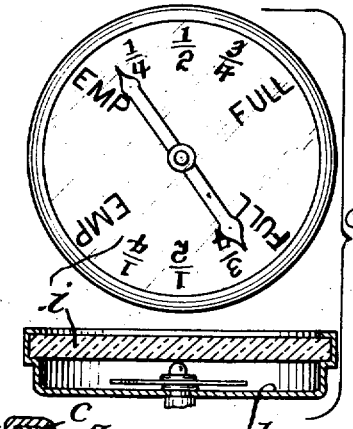

Figures 15 and 16 are views of different forms of dials and graduations.

Figure 17:
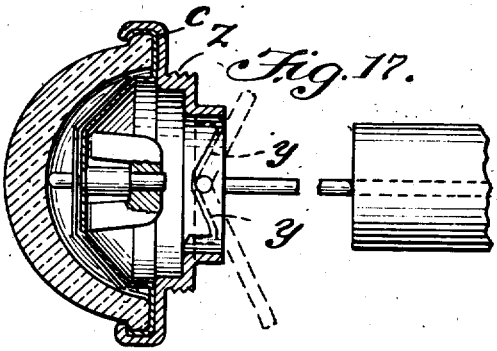
Figure 18:
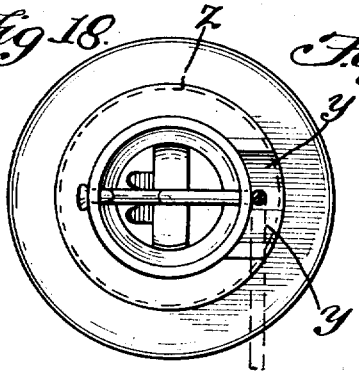
Figure 19:
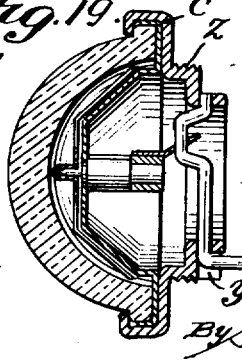

Figures 17, 18 and 19 are views of a further modification.

In the drawings the oil reservoir or tank *a* may be generally of ordinary form. It has a portion of its wall indented at *b* and at this indented portion the oil level gauge is located. This gauge comprises a housing 2 consisting of a thin shell of frusto-conical form having a flange 2*a* with an upturned rim 2*b*. The dial graduations are applied in any suitable manner to the inclined side of this housing. There are two sets of these graduations, one upside-down in relation to the other. The housing is so related to the tank that the axis of the conical shaped body is horizontal in both the normal and reversed positions of the tank. One set of graduations is applied to that portion or side of this conical housing which is uppermost when the tank is in normal position. That is to say, one set of graduations are on that portion of the housing which lies above the horizontal axis of the housing and the other set of graduations is on that portion of the inclined surface of the housing which is on the lower side thereof or in other words, below the horizontal axis. Each set of graduations lies partly on the left and partly on the right of a vertical plane passing through the axis of the housing.

Figure 2:
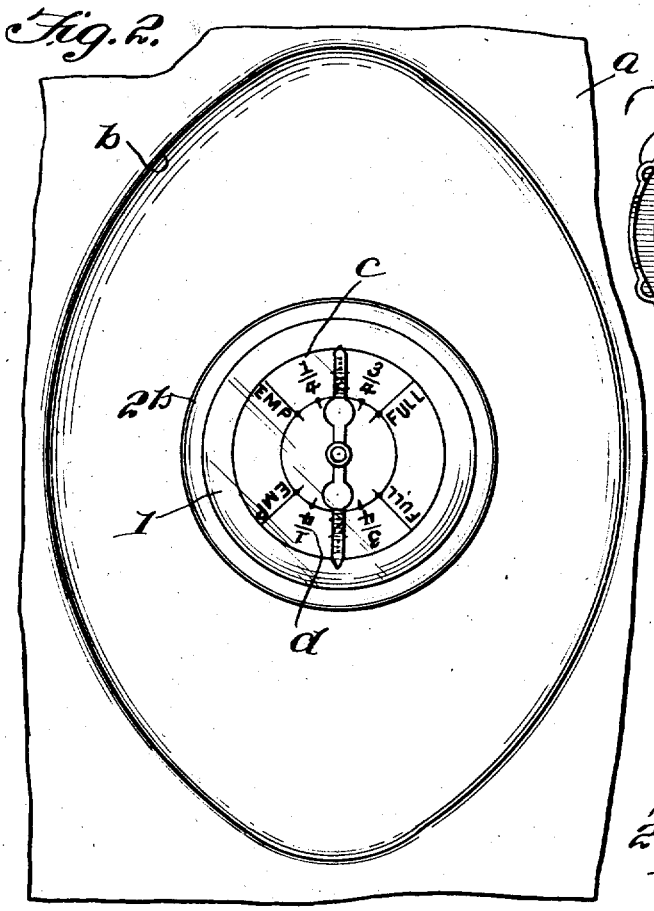
Figure 2 is a front view of Figure 1.
Figure 5:
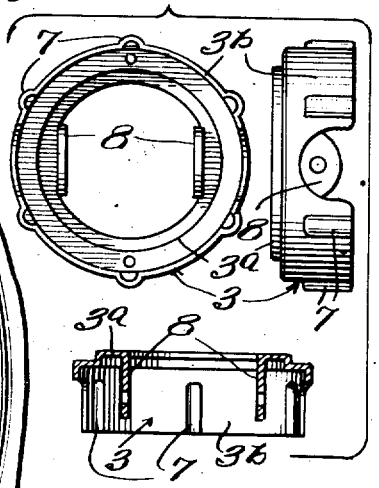
Figure 5 are views of the float arm supporting member.

The upper set of graduations as shown in Fig. 2 at *c* are readable when the tank is in normal position whereas the lower set of graduations *d* are upside-down when the tank is in normal upright position, but when the tank is reversed for filling then the latter graduations are upright for quick reading while the other or first mentioned set *c* are upside-down.

Tht frusto-conical gauge housing is combined with a crank support 3 which consists of a sheet metal member having a base portion 3*a* and a flange 3*b* extending at substantially right angles to the base. This member also has upstanding ears 8 perforated to afford bearings for a crank portion 9*a* of a float carrying arm 9, the float being indicated at 10. The two sheet metal members i. e. the frusto-conical housing 2 and the crank support 3 may be attached to each other in any suitable way as by rivets at *e* or by solder. The flange 2*a* of the frusto-conical housing is attached to the tank wall by soldering or in any suitable way to make a leak proof joint, said housing being located in an opening in the tank wall so as to effectually close said opening and to provide substantially a continuation of the tank wall. The rim 2*b* of this housing is turned over the edge of a lens member 1 which is of dome shape. The frusto-conical housing has riveted in a central hole thereof a stud or pin 4 on the outer pointed end of which an index member or pointer 5 is mounted to swing freely.

This index or pointer consists of arms bent downwardly from the main portion thereof to conform to the conical side of the housing. The pin 4 at its rear end has pivotally attached thereto the magnet 6. This magnet has secured to its side a fork member 12 with which engages the crank portion 9*a* of the right angularly bent portion of the float arm 9 so that as the float rises or falls the crank will operate the fork so as to turn the magnet about its axis which is the axis of the pin 4 and thus the pointer 5 will be caused to move over the dial to the proper graduation thereon to indicate the oil level.

As above indicated the graduations are so disposed that those on the upper side or inclined wall of the housing will be readily visible or legible by the observer because owing to the general position of the tank the upper inclined side of the conical housing will be substantially at right angles to the line of vision of the observer, whereas, the graduations at the lower half of the frusto-conical housing will be in a plane substantially coinciding with the line of vision and hence will be more or less hidden from view. The observer, therefore, will not be confused in making his reading from the gauge in respect to the oil level prevailing at the moment.

The fork shaped member or gear 12 may be secured to the side of the magnet either by soldering or riveting. The crank arm 9*a* of the float arm will operate in connection with this fork without lost motion so that the movement of the float will be communicated accurately to the magnet. The transparent member 1 is held by the overturned flange 2*a* of the housing. The crank supporting member 3 is formed with a plurality of bosses or extrusions 7 which aid as means for mechanically fastening the gauge in the opening of the tank wall and as intimated above, by soldering the flange of the housing to the tank wall an air tight connection was obtained. The movement of the float arm 9 will be arrested by coming in contact with the flange 3*b* of the crank support 3. It will be noticed that the float and the mechanism operated thereby will have a substantially similar action whether the tank be in normal upright position or in a reversed position, the movement of said float arm being communicated directly from the crank 9*a* through the fork 12 to the magnet so as to turn the same about the axis of the pin 4 and thus rotate the point.

Referring to Figures 10, 11 and 12 a soft steel ball 14 is movably mounted in a runway 15 of a gauge housing 2*c* and is held in position opposite the ends or poles of the magnet 6*a*. This magnet is fastened to the right angularly bent portion or crank arm 9*b* of the float arm 9 by any suitable means such as a clamp, a pin or simply by frictional contact. At each side of the magnet the housing 2*c* is provided with a bearing 18. This housing 2*c* has its main portion 2*d* formed on a curve like a portion of a cylinder and the groove 15 is formed in the face of this curved portion. The dial graduations are carried by the curved face of this housing in two sets, one on each side of the groove 15. The graduations on the right hand side of the groove are in correct position throughout for reading when the tank is in normal upright position, whereas the graduations on the left side of the groove are upside-down when the tank is in normal upright position. When the tank is reversed the graduations on the left side, as referred to above, assume a position reversed in respect to that shown in Fig. 11 so that they are readily readable whereas the graduations first mentioned assume a position upside-down. In this way the observer's attention is always directed to the correct graduation on the right hand side of the runway 15. Movement of the float will be imparted to the magnet, the poles of which swing in a curved path conforming closely to the curve of the housing and the soft metal ball will be moved to correspond to the movement of the magnet and thus by its position indicate the oil level according to the graduation which is adjacent the position to which the ball is moved. Referring to Fig. 13, instead of employing the soft metal ball as the indicator or index, we show a wire 14*a* having its ends 14*b* bent inwardly towards each other and seated in sockets 2*e* of a dome shaped housing 2*f*. This wire is adapted to swing over the surface of this dome shape housing, it being actuated by the magnet when this is swung by the movement of the float arm and its crank. The dial graduations for this modification shown in Fig. 13 are shown in Fig. 14 and consist of a single row of spaced apart, diamond-shaped figures. The graduations may be of any of the familiar forms. On the dial at the end of the row are located the words, or symbols, "Full" and "Empty," one of the words being in normal reading position and the other in inverted position. At the opposite end of the row of graduations corresponding words or symbols are arranged. The word "Full" at one end of the row of graduations is arranged in the same reading position as the word "Empty" at the opposite end of the row of graduations.

As will be understood, the indicator 14, in connection with the words or symbols referred to, will indicate more or less accurately and readily to the observer the liquid level in the tank or reservoir in both of its positions. The graduations additionally aid the observer in determining the liquid level condition in the tank, and the observer is still further aided by numerals associated with the graduations. As shown in Fig. 14, at the right hand side of the graduations the numerals "¼", "½" and "¾" are arranged in normal reading position, and corresponding numerals in inverted position are located on the left hand side of the graduations.

Figure 1:
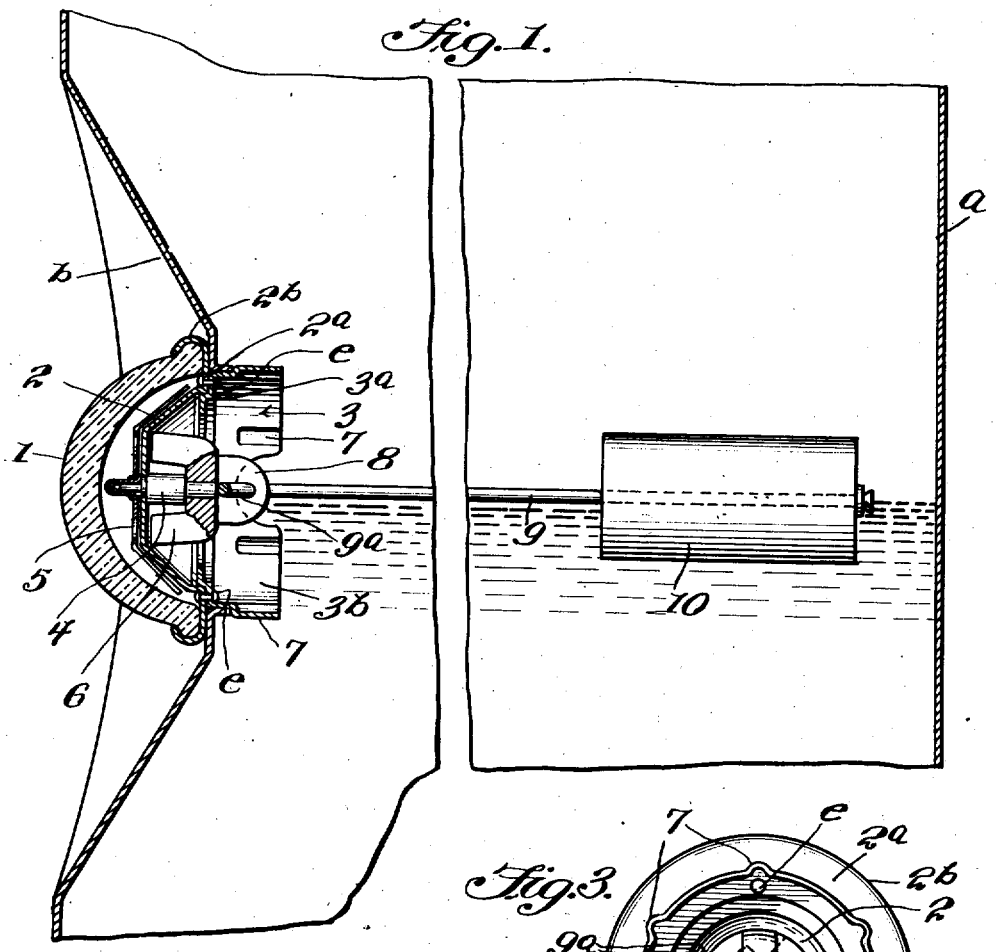
Figure 1 is a vertical sectional view in part of a tank with the oil level indicator combined therewith and shown with certain parts in section.
Figure 3:
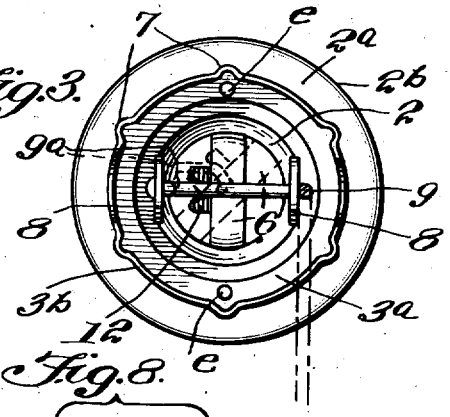
Figure 3 is a view of the gauge mechanism looking from the right of Figure 1.
Figure 4:
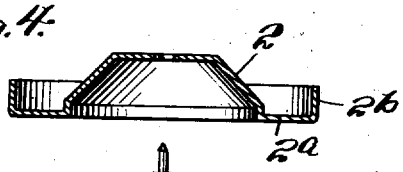
Figure 4 is a detail sectional view of the dial member.
Figure 9:
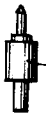
Figure 9 shows the pivot pin.
Figure 7:
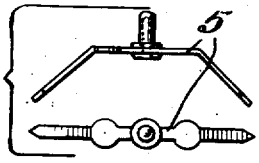
Figure 7 shows views of the pointer.
Figure 8:
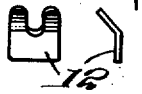
Figure 8 shows views of power transmitting fork.

In Fig. 15 a flat dial *f* is shown and across the center of this an upstanding wall *g* is arranged so that the graduations on the lower side of the dial will be hidden or obscured from view and when the tank is turned upside-down the other set of graduations will be obscured. In this form the glass member is of dome shape. In Fig. 16 the dial is flat as shown at *h* and the glass *i* is also of flat form. In this modification the graduations in the upside-down position on the bottom section forming the dial are not readily readable and hence the attention of the observer will be directed to the top row of graduations and the same thing is true when the tank is turned upside-down. The pointers of Figs. 16 and 17 are each operated in accordance with the influence of a magnet (not shown), arranged similarly to that shown in Fig. 1.

In Figures 17, 18 and 19 is shown another form of the invention in which the frusto-conical dial member is formed of brass and the member which serves as a support for the float arm is of pressed steel. These may be soldered together along the periphery of the said supporting member at the point C. The support for the crank is placed directly against the end of the conical dial member and the flange of the crank supporting member is pressed at points *y—y* so that stops are provided for the swinging float carrying arm. Screw threads may be formed at *z* to facilitate mechanical locking of the gauge body with the wall of the tank.

Referring to Figs. 15 and 16 it will be noticed that when the tank is empty, and likewise when it is full, the pointer stands at an inclination to a vertical plane lying along the axis of rotation of the pointer and the graduations are so disposed in relation to this inclined pointer that reading of the dial graduations can be effected with equal facility whether the tank be in feeding or filling position.

We claim:

1. A tank reversible from its normal feeding position to a position for filling, said tank having liquid level indicator means operative in both the said feeding and filling positions, and comprising index means mounted on the tank, a float within the tank, connections between the float and index means for operating the latter in either the feeding or filling positions of the tank, a set of graduations carried by the tank cooperating with the index to indicate the liquid level within the tank when in feeding position and a second set of graduations also carried by the tank to indicate the liquid level when the tank is reversed into filling position, each set of graduations being reversed in position relative to the other set, substantially as described.

2. A tank according to claim 1 having mounted thereon a dial member of generally conical form with the sets of graduations at opposite sides of an axial plane of said dial, substantially as described.

3. A reversible tank according to claim 1 having mounted thereon a dial presenting a convexly curved outer surface in respect to the plane of the tank wall, said dial having thereon the two sets of graduations, substantially as described.

4. A tank according to claim 1 in which the index means consists of a two armed pointer, said pointer being pivotally mounted on the tank intermediate of its arms, one set of graduations being adjacent the path of the end of one arm and the other set being adjacent the path of the end of the other arm, substantially as described.

5. A tank reversible from its normal feeding position to a position for filling having a movable index and a dial carried thereby, a float within the tank connected with the index for moving it according to the changes in the level of liquid in the tank and in either position of the said tank, two sets of graduations carried by the tank cooperating with the index to indicate the liquid level, one set for the feeding position and the other for the filling position of said tank, each set being easily readable when viewed from the same point at which the other set is not easily readable.

6. A tank reversible for filling having an oil level indicator mounted in its side wall, said indicator including a pivoted index having pointers extending in opposite directions, a magnet turnable about the axial line of the index for controlling said index, a horizontally disposed crank arranged adjacent the back of the magnet, bearings for said crank, said crank being connected to the magnet to turn the same and a float connected to the crank for operating the same.

7. In apparatus according to claim 6, a pin about which the index turns, said magnet also being supported and turnable about said pin.

8. Apparatus according to claim 6 in which the magnet carries a fork off-set relative to the pivot of said magnet, said crank being connected with the magnet by engaging said fork, substantially as described.

9. In apparatus according to claim 6 a float carrying arm in a portion of which the crank is formed, said crank extending substantially at right angles to the main body of said float arm, substantially as described.

10. A tank reversible for filling, oil level indicating means carried thereby having a dial, an index, a float, a float carrying arm having a crank with means operated thereby for operating the index, and a support for the crank having an extended wall serving as a stop for arresting the movement of the float in either direction relative to the indicating means, substantially as described.

11. A tank having an oil level indicator, a dial and index, a float, a float carrying arm having a portion extending horizontally at right angles to the main part of said arm and transverse to the axis of the indicator, means in which said right angularly extending portion is journalled, a magnet for operating the index, and means for operating the magnet from the right angularly extending portion to the float arm, substantially as described.

12. A tank having an oil level indicator comprising a dial and index located substantially in the plane of one wall of the tank, a magnet located immediately adjacent the dial and associated with the index for operating the same, a float, and an arm carrying the float and having a crank portion connected to the magnet for operating the same, substantially as described.

13. In combination a tank and a gauge having a convex shaped non-magnetic housing with a ball race therein, a ball index movable in said race, a magnet having its poles adapted to swing in the arc of a circle, a float, an arm carrying said float and having an end portion extending at right angles to the main part of the arm, said magnet being fixed to said right angularly extending portion of the arm, and a bearing on each side of the magnet in which the right angular arm portion is journalled.

14. A tank having a gauge with a convex shaped housing bearing the indicator graduations, an index member consisting of a curved member with its ends forming journals engaging bearing sockets in the housing, a magnet, a float and a float arm having a right angularly bent end to which the magnet is attached, said float arm being pivotally mounted by means of said bent end and operating the magnet which in turn operates the index, substantially as described.

15. In combination in a tank gauge, a dial member, a crank supporting member, a float arm having a crank mounted in said supporting member, said supporting member having stops pressed from the wall thereof to limit the movement of the float arm, substantially as described.

16. In combination a reversible tank having a dial and an index for indicating the liquid level in the tank in both its normal and reversed positions, a float within the tank, means operated thereby for operating the index, said index consisting of a pointer having arms extending in opposite directions, said pointer being pivotally mounted at a point intermediate the two arms, and two sets of graduations, one for each pointer arm, each set of graduations being substantially concentric with the path of the end of the pointer arm with which it cooperates, the graduations of one set being substantially upside down in respect to graduations of the other set, the said index having its arms normally i. e. when the tank is empty, at an angle to a plane disposed vertically and axially of the pivot of said index, the graduations in one set being located opposite graduations of like degree in the other set, substantially as described.

17. An appliance according to claim 5 in which the graduations of one set are upside down in relation to the graduations of the other set, substantially as described.

18. In combination with a tank reversible from its normal position for feeding into a position for filling, said tank having liquid level indicator means operative in both the said feeding and filling positions, and comprising index means and a dial mounted on the tank wall, a float within the tank, means operated by said float for operating the index, said dial having its opposite wall portions divergent towards the tank wall and arranged at substantially opposite inclinations to said wall, said dial carrying two sets of graduations, one set to cooperate with the index to indicate the level of the liquid when the tank is in feeding position, and the other set cooperating with the index to indicate the level of the liquid when the tank is in reversed position for filling, said graduations being on the opposite divergent sides of the dial, the uppermost graduations being thus more legible than the lowermost graduations when the dial is viewed from a level above that of the axis of the dial, substantially as described.

19. A gauge, for a reservoir occupying one position during the feed of the liquid therefrom and a second position during the filling thereof, for indicating the level in the reservoir in both of its positions, said gauge comprising a dial, an indicator, said dial having adjacent one end of the path of travel of the indicator liquid level symbols inverted in respect to each other, one of said symbols in one of the two positions of the tank being presented in normal reading position and the other not, a float and connections between the float and the indicator for moving the same in reference to the symbols.

20. A gauge for indicating the liquid level in each of two positions of a reversible liquid tank, comprising a dial, an indicator movable across the dial, a float in the tank, means interposed between the float and indicator for moving the latter corresponding to the movement of the float, indicator symbols on the dial adjacent opposite ends of the path of travel of the indicator denoting extreme positions of the liquid level in one position of the tank and in normal reading position during said position of the tank, and corresponding symbols adjacent the opposite ends of the path of movement of the indicator in inverted reading position in reference to the first named symbols.

21. A dial gauge for a tank having a liquid feeding position and an inverted filling position for indicating the level of the liquid content of the tank in either of said two positions, comprising a dial, an indicator mounted to have movement across the face of the dial, said dial having adjacent to each end of the path of travel of the indicator a pair of symbols inverted in reference to each other and connoting the extremes of the liquid level, one symbol of each pair occupying a normal reading position in one position of the tank and the remaining symbols occupying a normal reading position in the inverted position of the tank, a float, and means interposed between the float and the indicator for causing the same to move to positions along its path of travel corresponding to the liquid level in the tank in either of said two positions thereof and into operative relation to all the symbols.

FRED E. WHITE.
ALFRED RUTTIMAN.